Feb. 26, 1929.
C. VAN BRUNT
1,703,645
PROCESS OF CLARIFYING OIL
Original Filed March 3, 1924
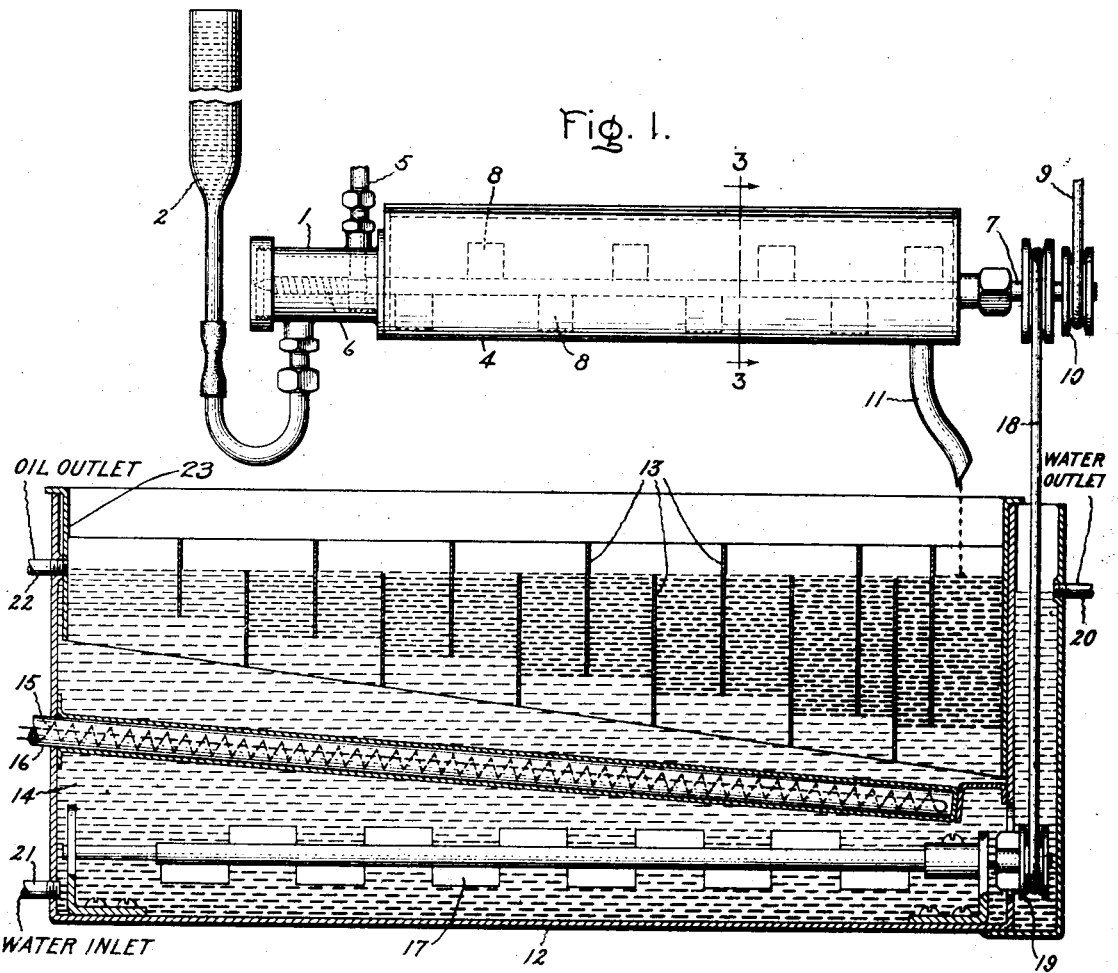
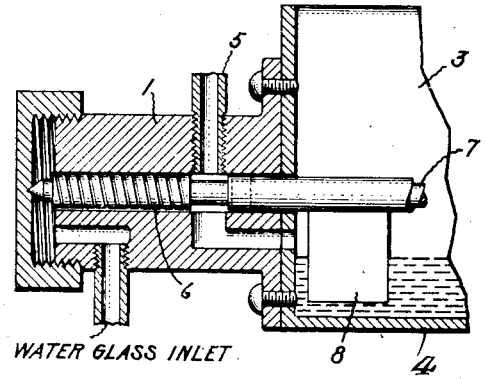
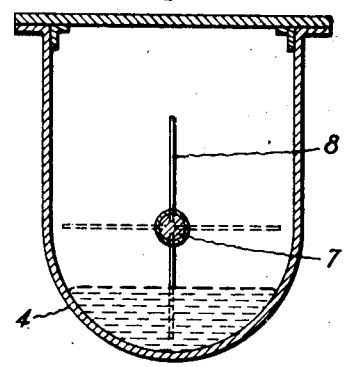
Inventor:
Charles Van Brunt,
by *Alexander D. Lunt*
His Attorney.

Patented Feb. 26, 1929.

1,703,645

UNITED STATES PATENT OFFICE.

CHARLES VAN BRUNT, OF SCHENECTADY, NEW YORK, ASSIGNOR TO GENERAL ELECTRIC COMPANY, A CORPORATION OF NEW YORK.

PROCESS OF CLARIFYING OIL.

Application filed March 3, 1924, Serial No. 696,655. Renewed November 24, 1928.

My present invention constitutes an improvement in the process of clarifying oil with water glass, which is described in my prior application Serial No. 746,640 filed October 29, 1924 which is a continuation in part of application Serial No. 503,016, filed September 24, 1921, and which is particularly applicable to the purification of spent lubricating oil from automobile crank cases.

The suspended matter in spent lubricating oil consists largely of carbonaceous matter and water together with some abraded metal and road dust. It is so finely divided that it settles out only with extreme slowness. In accordance with the process described in this prior application, the finely divided suspended matter is removed from the oil by treatment with an aqueous solution of an alkali silicate such as sodium silicate of the "water glass" of commerce. The dirty oil is mixed with the water glass, and the mixture then is floated upon water. Under the influence of the water glass, the solid matter becomes wetted, separates from the oil, and sinks into the water forming a sludge which is easily removed.

In the case of some crank case oils, separation and settling of suspended matter occurs much more slowly than in the case of other oils. It is the object of my invention to increase the rapidity of sludge separation and otherwise to improve the clarification process.

I have discovered that the oils which are not readily susceptible to treatment with water glass for the removal of suspended matter are rendered responsive by the addition of small amounts of substances of a resinous character, as for example, colophony. These substances are capable of saponification by the alkali constituent of the water glass, and their beneficial action apparently is due to the formation of the soap in contact with the suspended particles.

The accompanying drawing illustrates one form of apparatus suitable for carrying out my invention. Fig. 1 shows part of the apparatus in front elevation and part in longitudinal section; Fig. 2 is a horizontal sectional detail view of a feed apparatus, and Fig. 3 is a cross-section of a mixing chamber taken on lines 3—3 of Fig. 1.

In carrying my discovery into effect, resinous material is added to the oil to be purified, preferably as a solution in a volatile solvent readily miscible with the oil. For example, in the purification of crank case oil about 0.1 per cent by weight of colophony (rosin) is added to the oil, the colophony being dissolved in a convenient quantity of benzol, carbon tetrachloride, or other suitable solvent.

In some cases it is advantageous to add to the resinuous material, other non-resinous saponifiable materials, as for example, stearic acid, with the object of improving the clarity or "brightness" of the product. For example, an amount of stearic acid substantially of equal weight to the rosin may be added.

Colophony consists largely of abietic acid which combines with the easily dissociated water glass to form a soap (rosin soap). The presence of this soap affects interfacial tension of oil and water glass layers in such a way as to render the suspended particles to be more easily wetted by the silicate solution. After the oil and the solution of rosin have been thoroughly admixed with each other as described above, water glass is added; for example, to one gallon of oil mixed with rosin to be purified is added about from one to two ounces of water glass of a concentration having a specific gravity of 40 degrees Bé. The oil and this concentrated water glass solution are thoroughly admixed in any convenient way.

As shown in the drawing, the water glass solution is introduced by a pump 1 from a conduit 2 into a mixer 4, the oil being simultaneously drawn in from a conduit 5. As best shown in Fig. 2, the pump 1 is provided with a rotor 6 having a spiral groove. When oil is supplied at a constant rate, this type of pump meters the water glass supply, and maintains a definite ratio between the oil and water glass. Conveniently, the spiral groove pump 1 is driven from the same source of power which drives the oil pump delivering oil to the inlet 5. The groove in the rotor then is proportioned to give the proper water glass feed. Mounted in common with the rotor on the shaft 7 are a number of paddles 8, which thoroughly churn and mix the oil and water glass in the chamber 4. The shaft may be rotated by any convenient means as represented by a belt 9 running over a pulley wheel 10. The mixture of oil and water glass flows through a pipe 11 into a settling tank 12. A separate partition 23 sets into tank 12 and is provided with baffle plates 13 set at different heights from the bottom so that the oil will pass in a sinuous path under one partition and then over the next, then under the following and so on, as indicated. Under the oil and water glass mixture is a body of water 14 which preferably is maintained warm by an electric heater 15, which is contained in a tubular sheath 16. A temperature of about 80° C. is preferred.

As described and claimed in my prior application Serial No. 746,640, the water glass and suspended matter separate from the oil and form a sludge with the water. The sludge preferably is kept from settling to the bottom of the tank 12 where it would accumulate and clog the tank. For example, a stirring device 17 is provided driven by a belt 18 engaging with a pulley wheel 19 on the stirring device shaft. The water which carries suspended sludge is discharged through a pipe 20, clean water being introduced by a pipe 21. The clean oil is discharged through an outlet pipe 22.

As already mentioned, the separation of sludge from oil, which has been subjected to the high temperature and other deteriorating conditions of an internal combustion engine, occurs rapidly when an acid resin has been added to the oil. Secondly; the sludge produced with oils containing an acid resin usually is somewhat finer and remains suspended in water for a longer time than a sludge produced by the use of water glass alone. This is an advantage when it is desired to cause a continuous flow of the water under the surface of the oil to be purified, in order to uninterruptedly carry away the sludge. The sludges from the resin treated oils have a less tendency to form adhering crusts on the walls of the tanks.

What I claim as new and desire to secure by Letters Patent of the United States is:—

1. The step in the process of removing solid matter from used crank case oil by an aqueous solution of water glass, which consists in dissolving rosin in said oil previous to the water glass treatment.

2. The step in the process of reclaiming spent mineral lubricating oil containing finely divided solid matter by an aqueous solution of sodium silicate, which consists in adding to said oil about one-tenth of one per cent of colophony, and about one-tenth of one per cent of stearic acid by weight.

3. The step in the process of clarifying a contaminated mineral oil by causing solid matter to form a sludge with water glass, which consists in adding an acid resin to said oil.

4. The step in the process of clarifying a contaminated liquid petroleum product by treatment with water glass, which consists in adding thereto prior to said treatment about one-tenth of one per cent of rosin by weight.

5. The step in the process of reclaiming used mineral lubricating oil by forming a sludge therein with water glass, which consists in adding to said oil a solution of a fractional per cent by weight of rosin prior to the treatment with water glass thereby facilitating the sludge formation.

6. The process of clarifying used crank case oil containing suspended solid matter, which consists in adding thereto a mixture of colophony and stearic acid, thereupon mixing said oil with water glass to form a sludge therein, and finally removing the sludge by water in contact with the sludge containing oil.

In witness whereof, I have hereunto set my hand this 29th day of February, 1924.

CHARLES VAN BRUNT.